United States Patent
Kruger et al.

Patent Number: 5,337,342
Date of Patent: Aug. 9, 1994

[54] EMERGENCY CALL SYSTEM

[75] Inventors: Hans-Eckhard Kruger, Hildesheim; Harry Koch, Burgwedel; Jurgen Hartmann, Wolfenbuttel, all of Fed. Rep. of Germany

[73] Assignee: Robert Bosch GMbH, Stuttgart, Fed. Rep. of Germany

[21] Appl. No.: 944,437

[22] Filed: Sep. 14, 1992

[30] Foreign Application Priority Data

Sep. 14, 1991 [DE] Fed. Rep. of Germany ....... 4130647

[51] Int. Cl.$^5$ ................... H04M 11/00; H04M 11/04
[52] U.S. Cl. ........................................ 379/40; 379/58; 379/61; 340/539
[58] Field of Search ............. 379/40, 39, 41, 42, 379/43, 44, 46, 51, 61, 58; 340/539

[56] References Cited

U.S. PATENT DOCUMENTS

| | | | |
|---|---|---|---|
| 4,734,680 | 3/1988 | Gehman et al. | 340/539 |
| 4,969,181 | 11/1990 | Ho | 379/61 |
| 5,077,547 | 12/1991 | Burgmann | 340/539 |
| 5,140,628 | 8/1992 | Murata et al. | 379/61 |
| 5,155,469 | 10/1992 | Hartmann et al. | 340/539 |

FOREIGN PATENT DOCUMENTS

| | | | |
|---|---|---|---|
| 0235442 | 9/1989 | Japan | 379/61 |
| 0044161 | 2/1991 | Japan | 379/40 |
| 4-257158 | 9/1992 | Japan | 379/40 |
| 2166321 | 4/1986 | United Kingdom | 379/51 |

OTHER PUBLICATIONS

Jan Hashagen, Hausnotruf Bringt Selbstandigkeit, published in Dec., 1990, in Funkschau, pp. 56–59, and English translation.

Primary Examiner—Curtis Kuntz
Assistant Examiner—Stella L. Woo
Attorney, Agent, or Firm—Frishauf, Holtz, Goodman & Woodward

[57] ABSTRACT

In order to simplify the use of a portable emergency call device to place calls on a public telephone network, the emergency call receiver for receiving an automated call code signal from the portable device is part of a cordless telephone installation at the premises of a telephone subscriber. That installation includes a memory of telephone numbers subscribers to be alerted to the presence of an emergency call, together with logic for sequencing calls to several subscribers in repeated sequence until one of them receives the emergency call.

7 Claims, 3 Drawing Sheets

EMERGENCY CALL SYSTEM

This invention concerns emergency call systems of the kind including a portable emergency call device having an emergency call switch by which an automatic call code signal can be transmitted and a corresponding emergency call receiver for receiving such a signal from a portable device, recognizing the call code signal and then calling a telephone number over a telephone network for alerting a brief selected telephone party to the presence of the emergency call.

BACKGROUND AND PRIOR ART

The magazine Funkschau, issue 12 of 1990, pages 56–59, discloses an emergency call system of the above-mentioned kind which includes a combination of an emergency call receiver and a telephone number transmitting apparatus controlled by the receiver. That combination needs to be designed and manufactured only for this particular purpose.

SUMMARY OF THE INVENTION

It is an object of the present invention to provide an emergency call system of the above mentioned kind in which the expense and complication of the provision of the emergency call receiver and the telephone number addressing system is simplified.

Briefly, the emergency call receiver is located in a base station of a cordless telephone installation on a telephone service customer's premises. The base station, of course, is connected to a telephone network. For the purpose of the invention, the base station is equipped for recognizing an identifying code, received from the portable emergency call device, which identifies both the base station and the portable emergency call device, and also for recognizing the presence of a remote emergency call request code. The base station also has an electronic memory which stores several telephone numbers to be called automatically, in sequence, if a previously called number does not answer, in order to summon help when the telephone party who is first rung by telephone for an emergency cannot be reached. The call or calls to one or more telephone numbers are produced in response to an automatic call received by its emergency call receiver. In response to the emergency call code from the identified call device, those numbers are sequentially read out of memory and control the base station's transmission of telephone numbers for addressing the telephone network, over a special channel of the cordless telephone base station, for alerting a party addressed over the telephone network.

Cordless telephones are now produced in large quantities. Furthermore, no technical difficulties are involved in adapting a base station of a cordless telephone to the requirements of operating an emergency call system. For example, the special channel of the base station normally provided for control purposes can be utilized for the transmission of the call code signal of an emergency call and to program the usual short-code telephone number selection system provided for use by cordless telephones, in which various selected telephone numbers can be addressed by means of a one or two digit number.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
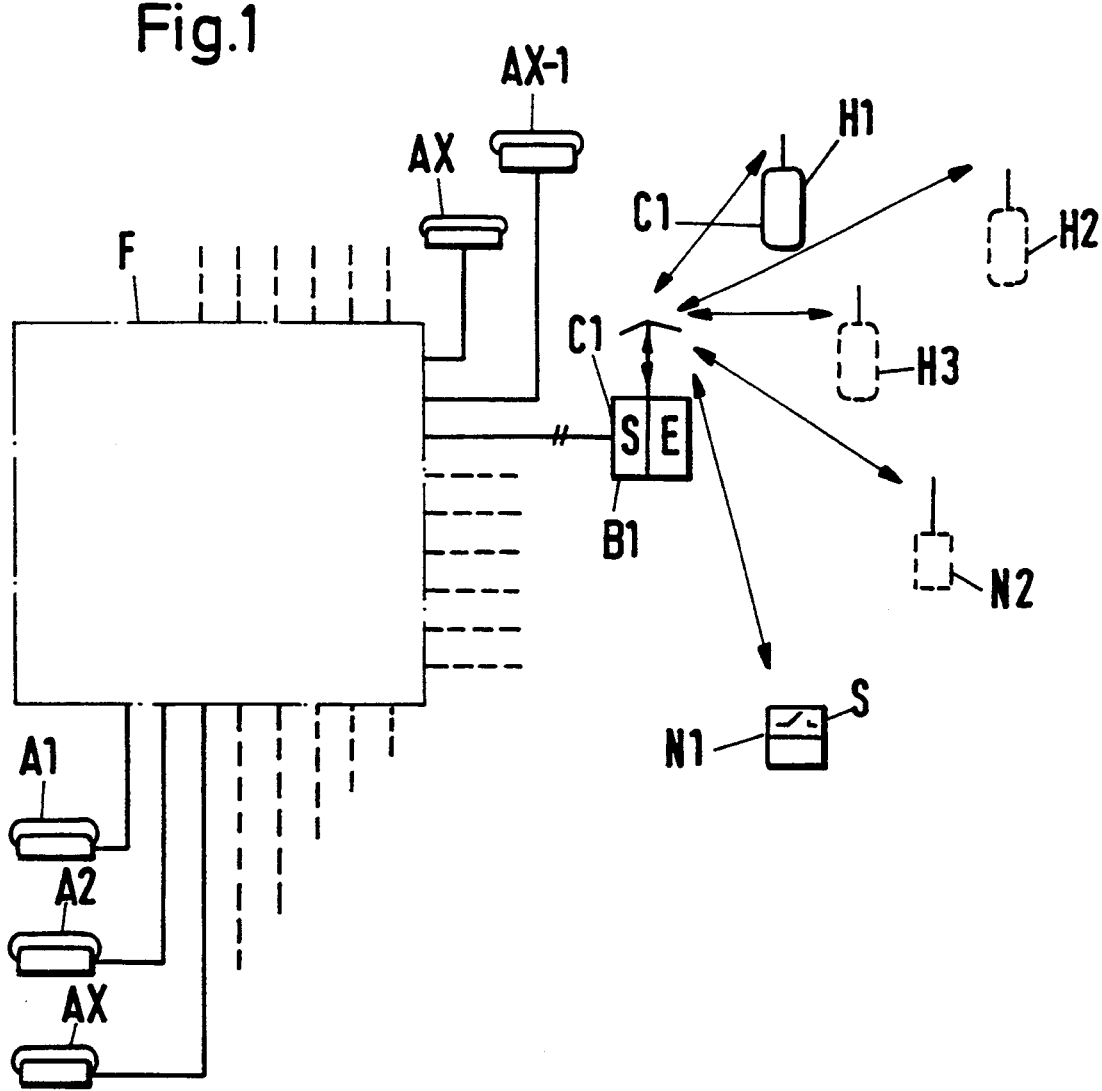
FIG. 1 is a circuit block diagram of an emergency call system according to the invention.

In FIG. 1 the letter F designates a telephone network that, for example, is a public telephone network to which a multiplicity of telephones A1, A2 . . . AX belong, of which only one is shown as a cordless telephone C1 in 1. Every cordless telephone, for example C1, consists essentially of a base station, for example, B1, with a transmitter S and a receiver E and also a portable cordless handset, for example H1. Still more portable handsets can belong to a single base station, as it shown in FIG. 1 at H2 and H3. One or more emergency call devices, in the illustrated case two of them, N1 and N2, are associated with the cordless telephone base station B1 in the same way as the handsets H1–H3 and each of these emergency call devices are emergency call transmitters or emergency call transceivers, a transceiver meaning a combined transmitter and receiver.

The method of operation of the above described emergency call system and portable emergency call transmitter is as follows.

Figure 2:
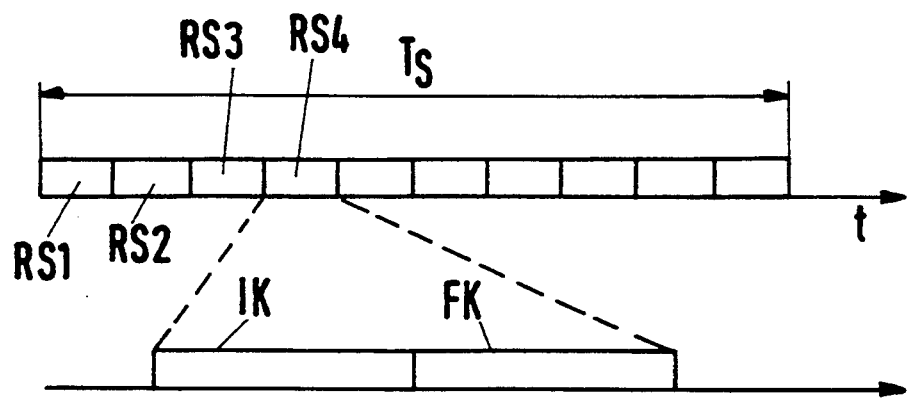
FIG. 2 is a schematic representation of the composition of a call code signal.

A user of the emergency call transmitter N1 is assumed now to find himself in an emergency situation. He has the emergency call transmitter either in his hand or carries it in his clothing or attached to a belt, or has it at hand in a vehicle. As soon as he is aware of the emergency situation he actuates the emergency call switch S of his emergency transmitter. The emergency transmitter operates on a particular radio channel, for example on the so-called special channel which is provided for control purposes for cordless telephones. No application for the right to occupy that channel is required for this special control channel in Germany and this is likely to be the case also elsewhere. After the actuation of the emergency call switch S, the emergency transmitter sends out a sequence of call code signals RS1, RS2 . . . for a predetermined transmitting interval $T_s$ (FIG. 2). This sequence of call code signals includes, for example recognizable identity codes IK for the emergency call transmitter, for example, N1, and for the base station, for example B1, and a telecontrol code FK, as schematically shown in FIG. 2.

Figure 3:
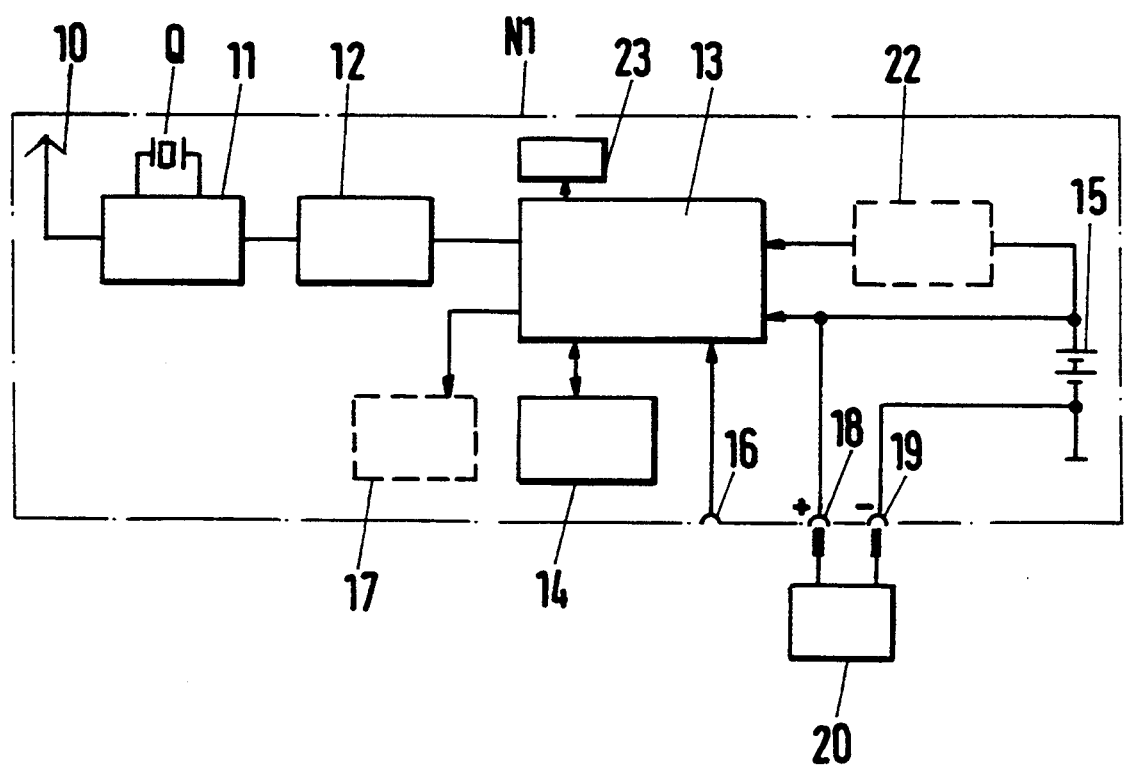
FIG. 3 is a circuit block diagram of an emergency call transmitter.

FIG. 3 shows by means of a circuit block diagram an example of the composition of an emergency transmitter, N1, which contains, as essential components, a transmitting antenna 10, a transmitting part 11 connected therewith, a data modulator 12, a control device 13, an electronic memory 14 connected to the latter and a d.c. voltage source 15 that is preferably a rechargable battery.

The control device 13 has a first connection 16 for supplying programming signals and second and third connections 18 and 19 for supplying charging voltage for charging or recharging the battery 15 by means of a charging device 20 connected therewith which may have a manual control 17 that is, for example, a push button. The programming of the control device 13 to enable it to send out the call code signal RS (FIG. 2) is performed just once, before or upon the delivery of the emergency transmitter N1 to a person who finds he needs to have it. At the location of the base station B1 there may well be a combination of a base station, terminal circuits, etc., connected with the telephone network F and a handset connected with the apparatus by a cable. In such cases the local telephone circuits and base station may advantageously have a common casing. That casing preferably contains a support for a handset H1.

In FIG. 3 there is shown a device 22 for charging state monitoring, which is an option for the emergency transmitter N1.

The device 22 samples the momentarily available charge capacity of the battery and provides over the control device 13, an indication of that capacity, for example by means of a visual display 23.

Figure 4:
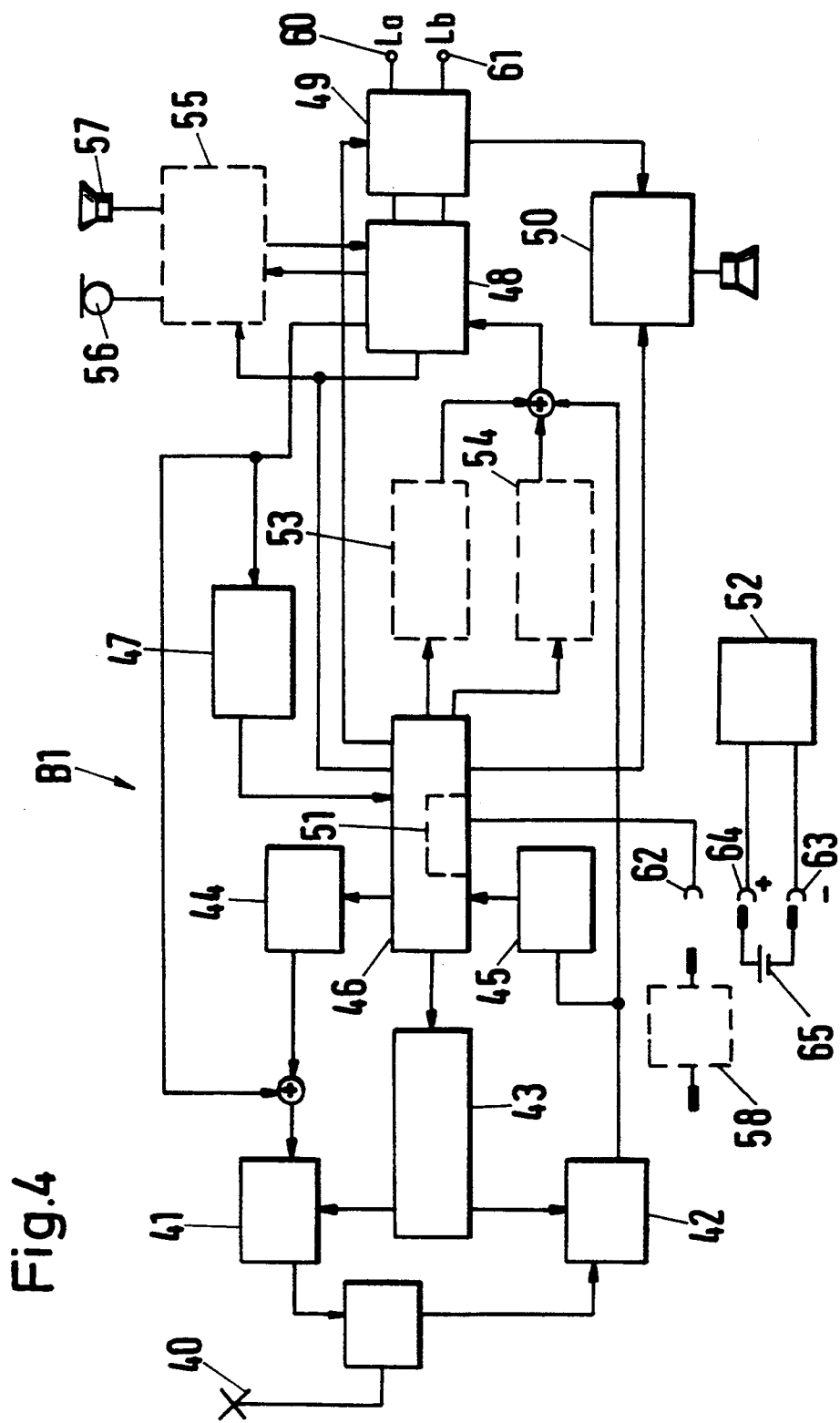
FIG. 4 is a circuit block diagram of the reception portion of the base station of a cordless telephone.

An example of the corresponding receiver E is shown in the circuit block diagram of FIG. 4 representing the base station B1, which includes, as essential components, a send/receive antenna 40, a transmitter unit 41, a receiving unit 42, a device for frequency processing 43, a data modulator 44 and a data demodulator 45, a control logic circuit 46 having a memory 51, a circuit for audio tone evaluation 47, a two-way termination circuit 48, a pulse number selecting device 49 and a device for call reproduction 50 as well as a charging apparatus 52.

There may be provided as options for the receiver E, a tone generator 53, a digital speech memory 54 and a hands-free talk (speakerphone) system 55 comprising a microphone 56 and a loudspeaker 57.

The pulse type number selector 49 has two outputs 60 and 61 which are connected to the telephone network F shown in FIG. 1. The control logic circuit 46 has a connection 62 for the supplying of programming signals and the charging device 52 has two connections 63 and 64 to which there can be connected a storage battery 65 which serves to provide the operating voltage for the receiving portion E of the base station B1.

The manner of operation of the base station B1 (FIG. 4) of the cordless telephone installation C1 corresponding to the emergency call transmitter N1 is as follows.

The receiver E continually searches all speech channels of the cordless telephone system as well as the special channel. The maximum search time is less than the transmitting time $T_s$ (FIG. 2) of the emergency transmitter N1.

If now the receiver E has correctly received the call code signal RS of the emergency transmitter N1 and has decoded it and checked it for agreement of the identification code IK with its own code and has recognized the remote control code FK, then in the receiver E there is automatically initiated the retrieval of the telephone number stored in the memory 51 (FIG. 4) of the receiver previously designated by the user of the emergency transmitter N1 for reaching the telephone subscriber to be notified. Still more call numbers of other telephone subscribers to be notified may be stored in the memory 51, who can be called, one after another, if the previous calls are unsuccessful for lack of available circuits, busy telephone connection or failure of the subscriber to reply after a predetermined number of rings, unil a telephone connection is finally made. If, after going through the list, no telephone connection is reached, the calling of the persons to be notified can be repeated.

The establishment of the connection can advantageously be listened to at the base station B1 by means of a speakerphone 55 operation of which is well known to persons in the telephone art. The establishment of the connection can be announced either by a special tone or a speech announcement over the loud speaker 57 of the speaker phone 55.

The telephone subscriber who is called for the above procedure, for example at location A1 (FIG. 1), receives an announcement of the presence of the emergency call either by a special predetermined tone sequence, by an automatic speech announcment from a digital speech memory 54 of the base station B1 or by speaker phone directly from the person making the emergency call.

The last named alternative assumes that the base station B1 (FIG. 4) is equipped with a speaker phone.

The telephone subscriber of the telephone A1 who is called as a result of an emergency can then initiate corresponding steps for providing help. If this subscriber also has an emergency call device in the form of a combined transmitter and receiver apparatus, he can also speak with the person initiating the emergency call.

In what follows advantageous further developments of the emergency call devices are explained.

in order to designate the readiness of the emergency call device N1 in the base station B1, for example, by a special manipulation of the controls of the emergency transmitter, perhaps the manipulation of a key, or perhaps by an automatic activation after certain lapse of time, an acoustic or optical readiness indication can be generated at the base station B1 without the base station then producing a connection to a telephone such as the telephone A1.

in the emergency call transmitter, for example, N1, instead of the usual PLL synthesizer of cordless telephones a quartz controlled oscillator (compare quartz Q in FIG. 3) can be used for generating the high frequency signal. That leads to the advantage that the emergency transmitter operates at low current consumption and is economic to manufacture.

for emergency call initiation there can be provided a direct radio connection to one of the handsets H1, H2, H3 of the cordless telephone C1, so that both an acoustic signal with a tone sequence or a speech announcement or even speakerphone communication with a base station B1 is possible. This manner of operation amounts to intercom operation of the system.

A test of the rechargable battery of an emergency call device N1 can be performed as follows. Information concerning the charge state of the rechargable battery 15 is sent out with every test call of the emergency call device N1. This can be provided for automatically or as one of the functions of a manually controllable test button. In this operation the information is obtained from the charge condition monitor 22 which measures the charge state and is transmitted in the digital telegram form shown in FIG. 2. As a result the base station B1 will be able to produce an acoustic or optical warning signal before a complete discharge of the battery takes place.

the user of the emergency call device, for example N1, can have a test function initiated manually by an attendant, for example by a spoken request or over the speaker phone 55 (FIG. 4) or by means of a call tone sequence of a calling device that is plainly different from other call tone sequences.

The initializing of an emergency call device N1 associated with a nearby cordless telephone installation preferably takes place in the following way.

- the emergency call device is placed on the casing of the associated base station where an adapter 58 supplied together with an emergency call device provides for a connection between the memory 51 of the base station and the control circuit 13 of the emergency call device, for example through the contacts 62 (FIG. 4) or 16 (FIG. 3).
- as an alternative to the foregoing, the initialization function can also be performed in a button routine performed with one of the handsets H1 to H3 which routine is protected by a personal identification number (PIN) that must also be supplied. In such a case the identity code of the base station is transmitted to the emergency call device. In that way the advantage of a simple storage behavior is obtained, since no factory programming of the emergency call device is necessary. The introduction of an emergency call device in an existing cordless telephone system is thus made possible without requiring the service of supplementary service personnel.
- operation of several emergency call devices at one base station, located, for example at a nursing home or at a residence for the elderly, is similarly easy to provide. In such a case initialization is performed as above described with provision of a device number to be given to the emergency call device to be programmed in the particular case, this number again being provided as a tone sequence from a handset of the cordless telephone system.
- when different emergency call numbers are allocated to the individual emergency call devices N1, N2 . . . . a short code memory can be used in each device for identifying calls from and to the device.
- the power supply for the base station preferably includes a storage battery 65 having a standby connection, so that the emergency call function will still be available in the case of a failure of the commercial power lines at the location.
- it is also advantageous to utilize the reserve storage battery of a cordless telephone in the charging circuit of the base station as a standby storage battery.

I claim:

1. An emergency call apparatus system including a portable emergency call device having an emergency call switch by actuation of which an automatic call code signal is transmitted and a corresponding stationary emergency call receiver equipped for receiving an emergency call signal from said portable device, recognizing said automatic call code signal as showing a need for calling a telephone number over a telephone network for alerting a preselected telephone party to the presence of the emergency call, characterized in that said emergency call receiver is a receiver in a base station (B1) of a cordless telephone local system (C1), which base station (B1) is connected to a telephone network (F), and said base station (B1) is equipped with a plurality of speech communication channels for short-code access by radio transceivers to said base station and a special channel inaccessible to normal speech communication of users of the system and comprises:

means for recognizing an identifying code, which identifies both said base station and said portable emergency call device and which code forms part of said automatic call code signal, and for recognizing the presence of a remote emergency call request code which call request code also forms part of said automatic call code signal;

means in said emergency call receiver for control of a response to a call from said emergency call device, said response including activation of and entry into said special channel, said receiver control means including, in its control logic, an electronic memory (51) for storing a sequence of telephone numbers to be called in response to an automatic call code signal received by said emergency call receiver from said portable emergency call device, and for responding to said automatic call code signal by calling said stored numbers in sequence until an answering connection is established denoting at least an acknowledgement of receipt of the emergency call by a corresponding called party and said portable emergency call device (N1) comprises, in addition to said emergency call switch and means responsive to said emergency call switch for transmitting an automatic call code signal:

means for generating, for said automatic call code signal, a code signal (IK) designating the identities of said base station (B1) and of said portable emergency call device and a code signal (SK) designating a radio-communicated emergency call which needs to obtain access to said special channel of said base station, and control means (13) for producing, during a said automatic call code signal, a continual repetition of at least part of said identification code signal (IK) of said portable emergency call device (N1).

2. An emergency call apparatus system according to claim 1 wherein said portable emergency call device and said emergency call receiver have frequency control means respectively for a transmission frequency and a reception frequency that provide communication between them on a predetermined frequency and wherein said portable emergency call device is programmed for recognizing an identifying code which identifies said base station.

3. An emergency call apparatus system according to claim 1, wherein said base station further comprises a speakerphone unit (55) having a microphone (56) and a loud speaker (57).

4. An emergency call apparatus system according to claim 1, wherein said emergency call switch of said portable emergency call device, which is connected for producing the transmission of said automatic call code signal, is also connected for an alternative function which is eliciting test information relating to said portable emergency call device.

5. An emergency call apparatus system according to claim 4, wherein said test information transmitted in response to operation of said emergency call switch of said portable emergency call device is symbolized information descriptive of degree of continuing readiness of said portable emergency call device for transmitting emergency calls.

6. An emergency call apparatus system according to claim 1, wherein said base station further comprises, in addition to means for communication with a cordless telephone, a telephone handset connected by cable to the remainder of said base station.

7. An emergency call apparatus system according to claim 6, wherein said base station has support means for holding in readiness a handset of said cordless telephone.

* * * * *